United States Patent
Kremer et al.

(10) Patent No.: US 8,360,101 B2
(45) Date of Patent: Jan. 29, 2013

(54) ARRANGEMENT OF A FILLING AND FILTERING DEVICE IN A VALVE BODY

(75) Inventors: Paul Kremer, Walferdange (LU); Claude Risse, Bertrange (FR)

(73) Assignee: Luxembourg Patent Company S.A., Lintgen (LU)

( * ) Notice: Subject to any disclaimer, the term of this patent is extended or adjusted under 35 U.S.C. 154(b) by 241 days.

(21) Appl. No.: 12/747,058

(22) PCT Filed: Dec. 12, 2008

(86) PCT No.: PCT/EP2008/067379
§ 371 (c)(1),
(2), (4) Date: Jun. 9, 2010

(87) PCT Pub. No.: WO2009/074668
PCT Pub. Date: Jun. 18, 2009

(65) Prior Publication Data
US 2010/0263747 A1    Oct. 21, 2010

(30) Foreign Application Priority Data
Dec. 12, 2007   (LU) ........................................ 91384

(51) Int. Cl.
*F16K 24/00*    (2006.01)
*F16L 37/28*    (2006.01)
*B67D 7/76*    (2010.01)
(52) U.S. Cl. ..... 137/588; 137/544; 137/549; 251/149.6; 222/3
(58) Field of Classification Search .................. 137/588, 137/597, 884, 544, 549, 550, 596.1; 251/149.6; 222/3, 4, 5
See application file for complete search history.

(56) References Cited

U.S. PATENT DOCUMENTS

| 5,996,625 A | * | 12/1999 | Collado et al. | ........... 137/614.19 |
| 7,086,414 B2 | * | 8/2006 | Phillips et al. | ........... 137/505.35 |

FOREIGN PATENT DOCUMENTS

| EP | 1126202 A | 8/2001 |
| EP | 1437538 A | 7/2004 |
| FR | 799122 A | 6/1936 |
| FR | 2724241 A | 3/1996 |
| FR | 2757243 A | 6/1998 |

OTHER PUBLICATIONS

International Search Report from PCT/EP08/67379.

* cited by examiner

*Primary Examiner* — Craig Schneider
*Assistant Examiner* — Atif Chaudry
(74) *Attorney, Agent, or Firm* — James E. Walton; Richard G. Eldredge

(57) ABSTRACT

The invention relates to a valve device of the cylinder valve type, comprising a filling coupling (11) connected directly to the inlet (2) of the valve without passing via the valve shut-off device (4, 8). A filtering element (12) is positioned in a chamber at the intersection between the inlet to the valve and the device for shutting-off the valve. This allows the filter to be arranged optimally from the accessibility point of view and also from the gas flow point of view. Specifically, the filter is arranged in the chamber in such a way as to filter the stream of gas flowing towards the outlet (3) of the valve via the shut-off device, thus protecting the latter, and also in such a way as not to filter the stream of filling gas flowing from the filling connector of the valve towards the inlet.

10 Claims, 1 Drawing Sheet

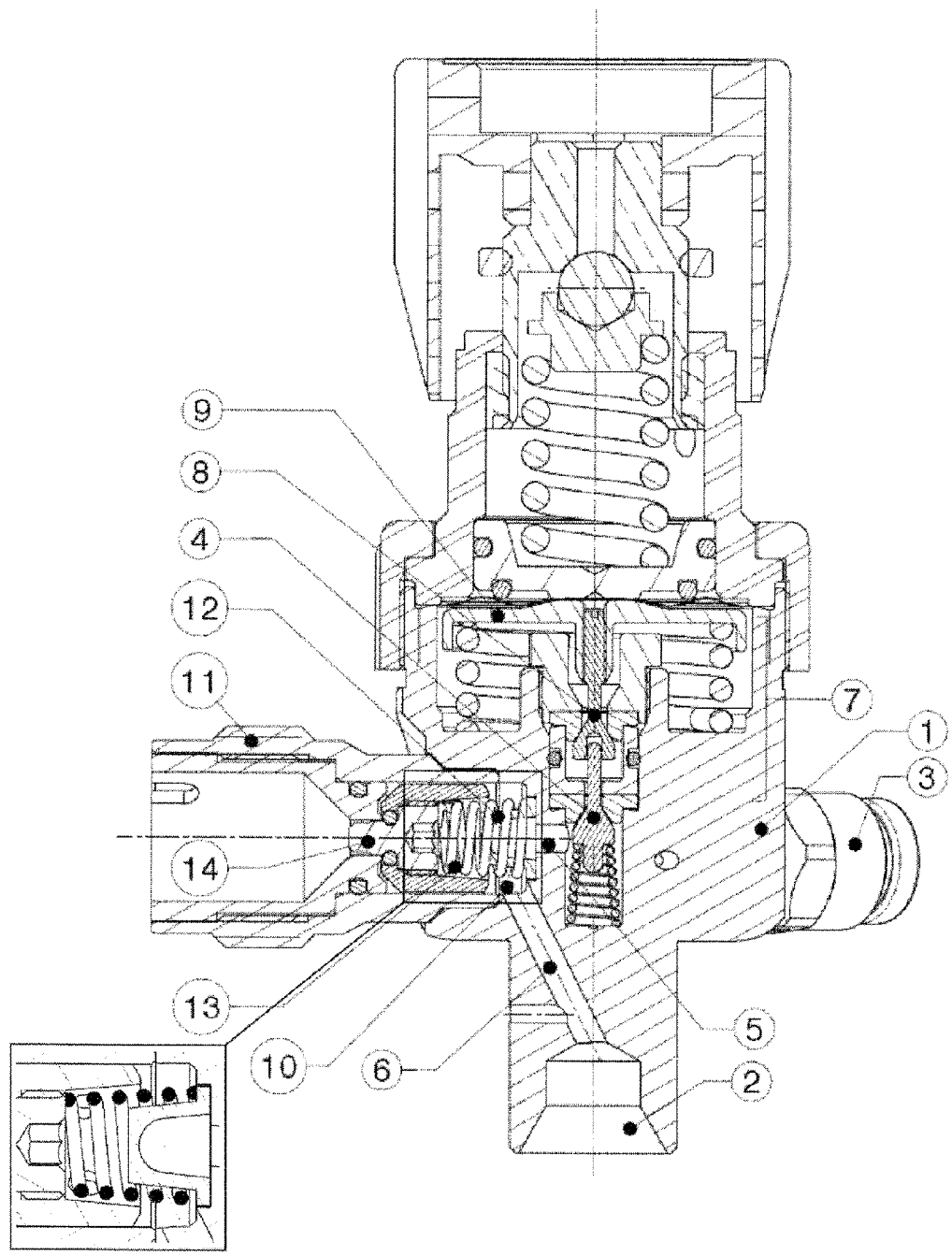

US 8,360,101 B2

ARRANGEMENT OF A FILLING AND FILTERING DEVICE IN A VALVE BODY

TECHNICAL FIELD

The present invention relates to a particular arrangement for a filling device on a valve for a gas cartridge, this arrangement being preferably in relation with a filtering device.

PRIOR ART

The document WO 2005/003607 (OCENCO, INC.) Jan. 13, 2005 discloses a valve for a gas cylinder whereby the shut-off device conventionally comprises a movable element cooperating with a fixed seat with respect to the body so as to ensure the valve is tight. The seat consists of a deformable disc housed on a shoulder at the bottom of a bore of the body of the valve. The surface of the movable element cooperating with the deformable seat forms a concentric ring with the seat in order to form a diverted passage for the gas to prevent direct contact of pressure gas against the surface of the deformable seat. The valve body is provided with a passage at the center of the shoulder so as to communicate with the cylinder. The orifice of the ring corresponds to this passage. This passage is provided with a filter made of sinterbronze to filter any solid contaminant entrained in the circulating gas, thus preventing the deformable seat from being damaged. The teachings of this document tend to resolve the deterioration problem of the deformable seat. This document in no case tackles the question of cylinder filling. Filling via the outlet orifice is not practicable, at least not for a high flow, in view of the loss of charges the filter would cause. Furthermore, such a configuration would cause solid contaminants to accumulate on one side of the filter to then evacuate them toward the shut-off device and the installation connected during operation of this valve. The very limited accessibility to the filter makes maintaining it difficult.

The document GB 2300692 A (KABUSHIKI KAISHA NERIKI) Nov. 13, 1996 discloses a gas cylinder valve, said valve comprising a shut-off device and, downstream, a device for maintaining residual pressure in the area where gas exits the valve. This device also allows for gas to travel in the opposite direction for filling the cylinder. No filtering system is provided.

The document WO 02/097314 (HULL, WENDELL) Dec. 5, 2002 discloses a gas cylinder valve comprising a filtering device acting only when gas flows and not during the filling. Of course, this device allows for filling the cylinder via the high flow orifice while ensuring the valve seat is protected, but it is relatively complex and costly.

The object of the invention is to avoid the above-mentioned problems, more particularly to propose a design for a cylinder valve enabling the filling of a cylinder without losses of charges and risks of breaking and/or blocking the filtering elements while ensuring a protection of the sensitive elements of the valve such as the valve seats and/or a reducing valve for the solid contaminants potentially present in the gas.

DESCRIPTION OF THE INVENTION

The invention relates to a valve device for a gas container of pressured gas comprising a body with a first coupling adapted to be connected to the gas container and serving as a gas inlet, a second coupling serving as a gas outlet and a first passage connecting the first and second gas inlet and outlet couplings, respectively; a shut-off device for the first passage between the inlet and the outlet; filtering means arranged upstream of the shut-off device; whereby the body additionally comprises a third coupling used for filling the container, communicating with the inlet of the device via a second passage connecting the third coupling with the inlet of the device without passing by the shut-off device.

Preferably, the filtering means are positioned at the intersection of the first and second passages.

Preferably, the filtering means are arranged so as to filter gas only when it flows.

Advantageously, the filtering means are arranged in a chamber at the intersection of the first and second passages so as to filter the stream of gas of the first passage.

The volume of the chamber is preferably greater than the volume of the filtering means so as to allow the gas flow coming from the third coupling towards the inlet to bypass the filtering means.

The chamber can be delimited, at least in part, by an element of the third coupling.

Preferably, the chamber has a generally cylindrical shape, the intersection of the first passage with the chamber being located at the bottom of the chamber and, preferably, the intersection of the second passage with the chamber being located in the area of the chamber periphery.

Advantageously, the filtering means comprise an element made of porous material, preferably hat-shaped, arranged at the bottom of the chamber opposite of the intersection of the first passage with the chamber.

Preferably, the third coupling comprises an element screwed into the chamber; the filtering means being kept in place by a spring pushing on the screwed element and the filtering means, preferably on the flange of the hat-shaped element.

Advantageously, the third coupling comprises an anti-return clapper comprising a spring keeping the filtering means in place in the chamber.

BRIEF DESCRIPTION OF THE DRAWINGS

FIG. 1 is a cross-sectional view of a valve with an integrated reducing valve spring in accordance with the invention.

BEST MODE OF THE INVENTION

The valve is constituted of a body 1 comprising a gas inlet coupling 2. This coupling is adapted to be connected to a gas container such as a cylinder or a pressurized gas conduit. The body also comprises a gas outlet coupling 3 adapted to be connected to the service line of a customer. The outlet coupling 2 communicates with the outlet of the reducing valve 7 by a hole made in the body and not represented. The reducing valve 7 in particular comprises two conical blocking elements 8 and 4, in series, also used as a valve shut-off device. Indeed, this construction in particular provides a double safety since the two blocking elements take support on their respective seats in the shut-off position of the valve, as shown in the drawing. In this state, the upper device, used to pretension the spring of the reducing valve is completely relaxed, which means that the movable portion 9 of the reducing valve is subjected to a minimal stress directed downwardly. Consequently, the spring of the reducing valve raises the movable portion 9 to its maximum so that the first (upper) blocking element 8, which is attached to the movable part 9 of the reducing valve, takes support onto its seat and is gastight. Furthermore, the second (lower) blocking element 4 is dimensioned and connected to the first by means of a stop system so that it comes to take support on its seat during an upward vertical movement of the two blocking elements and on the movable portion of the reducing valve before the first. The stop type of connection between the two blocking elements as well as the spring of the second blocking element cause the second blocking element to shut-off gas flow before the first. Once the two blocking elements are supported on their respective seats, there is a double safety with respect to the shut-off.

It must be noted that this dual shut-off device integrated into a reducing valve device is given entirely as an example and in no case should limit the invention. Indeed, the concept of the present invention applies to all types of shut-off devices, including reducing valve devices acting as a shut-off device.

The shut-off device 4 and 8 is connected to a chamber 10 comprising a filter 12. The chamber has a generally cylindrical shape and is machined directly in the body 1. The filter 12, which is hat-shaped, thus caps the passage orifice (5) connecting the chamber to the shut-off device 4 and 8. The chamber is dimensioned so that its volume is greater than that of the filter, thus allowing the gas to bypass it.

The chamber 10 is connected to the inlet coupling 2 via a passage 6. In the example herein-described, a coupling 11 for filing the container is in direct contact with the chamber 10. The advantage of this arrangement is that it is easy to make, in terms of machining as well as mounting. The coupling 11 is screwed into a threading formed in the body. The coupling 11 comprises means for connecting with a filling source and an anti-return clapper 14. The assembly shown in the drawing is particular in that the filter 12 and the anti-return clapper 14 cooperate insofar as the spring 13 of the clapper 14 keeps the filter 12 in place. Preferably, the filter is housed in a housing in the chamber.

It must be noted that the filter could have other designs, for example of the cylindrical type or any other design susceptible of filtering the gas flow flowing from the container toward the outlet via the shut-off device while not, or at least not substantially, filtering the gas flow flowing from the filling coupling toward the container during a filling operation.

The chamber 10 is, in the example of the drawing, laterally arranged with respect to the shut-off device 4 and 8. The passage 5 is therefore horizontal and the passage 6 is oblique. It must be noted that this arrangement is given as an example and that other configurations are also possible. Indeed, the chamber could be positioned lower or even below the device for shutting off the valve.

This design has multiple advantages. First, it is very simple and thus inexpensive to make. Indeed, the machining of the chamber 10 is used to make the chamber as well as the connection for the filling coupling. Furthermore, the spring of the anti-return clapper that keeps the filter in place reduces the space requirement and the number of pieces. The position of the chamber provides the chamber with a certain volume and therefore good flow characteristics. The size of the chamber combined with the design of the filter at the bottom of the chamber allows for a specific filter size and thus reduced losses of charges while ensuring a good quality of filtering.

The invention claimed is:

1. A valve device for a pressurized gas container, comprising:
   a body having a gas inlet coupling adapted to be connected to the gas container, a gas outlet coupling, and a first passage connecting the gas inlet coupling to the gas outlet coupling;
   a shut-off device disposed between the gas inlet coupling and the gas outlet coupling;
   a filtering means disposed upstream of the shut-off device;
   a third coupling configured for filling the gas container;
   a second passage connecting the gas inlet coupling to the third coupling without passing by the shut-off device; and
   a chamber disposed at the intersection of the first passage and the second passage;
   wherein the filtering means is arranged, so as to filter the gas flow of the first passage
   wherein the chamber has a generally cylindrical shape;
   wherein the intersection of the first passage with the chamber is located at an end of the chamber; and
   wherein the intersection of the second passage with the chamber is located at a peripheral edge of the chamber.

2. The valve device according to claim 1, wherein the filtering means is positioned at the intersection of the first passage and the second passage.

3. The valve device according to claim 1, wherein the filtering means is arranged so as to filter gas only when gas flow is circulating.

4. The valve device according to claim 1, wherein the volume of the chamber is greater than the volume of the filtering means, so as to enable the gas flow flowing from the third coupling toward the gas inlet coupling to bypass the filtering means.

5. The valve device according to claim 1, wherein the chamber is delimited, at least in part, by an element of the third coupling.

6. The valve device according to claim 1, wherein the filtering means is made of a porous material and is disposed at an end of the chamber in front of the intersection of the first passage and the chamber.

7. The valve device according to claim 6, wherein the filtering means is hat shaped.

8. The valve device according to claim 7, wherein the third coupling comprises:
   an element coupled to the chamber; and
   wherein the filtering means is kept in place by a spring pushing onto the element and the filtering means.

9. The valve device according to claim 8, wherein the spring bears against a flange of the hat-shaped filtering means.

10. The valve device according to claim 1, wherein the third coupling comprises:
    an anti-return clapper having a spring for maintaining the filtering means in place within the chamber.

* * * * *